(12) United States Patent
Poole

(10) Patent No.: US 11,198,185 B2
(45) Date of Patent: Dec. 14, 2021

(54) SCREW SIZING SYSTEM FOR POCKET HOLE JIGS

(71) Applicant: Robert N. Poole, Coronado, CA (US)

(72) Inventor: Robert N. Poole, Coronado, CA (US)

( * ) Notice: Subject to any disclaimer, the term of this patent is extended or adjusted under 35 U.S.C. 154(b) by 129 days.

(21) Appl. No.: 16/693,274

(22) Filed: Nov. 23, 2019

(65) Prior Publication Data
US 2020/0164446 A1 May 28, 2020

Related U.S. Application Data

(60) Provisional application No. 62/771,138, filed on Nov. 25, 2018.

(51) Int. Cl.
*B23B 47/28* (2006.01)

(52) U.S. Cl.
CPC ........ *B23B 47/287* (2013.01); *B23B 2247/10* (2013.01); *B23B 2260/088* (2013.01)

(58) Field of Classification Search
CPC .............. B23B 47/287; B23B 2247/10; B23B 2247/12; B23B 2260/124; B23B 2260/088; B23B 2260/104; B23B 47/288
See application file for complete search history.

(56) References Cited

U.S. PATENT DOCUMENTS

| | | | | |
|---|---|---|---|---|
| 1,984,839 A * | 12/1934 | Murray | ..................... | G09F 3/00 |
| | | | | 116/200 |
| 4,841,653 A * | 6/1989 | Negley | ..................... | G09F 3/00 |
| | | | | 116/201 |
| 4,982,627 A * | 1/1991 | Johnson | ................ | B23B 31/005 |
| | | | | 81/121.1 |
| 5,031,488 A * | 7/1991 | Zumeta | ................. | B25B 15/008 |
| | | | | 81/180.1 |
| 7,021,878 B1* | 4/2006 | Albertson | ................. | B27F 7/00 |
| | | | | 403/27 |
| 7,641,425 B2* | 1/2010 | Sommerfeld | ......... | B23B 47/287 |
| | | | | 408/115 R |
| 8,231,313 B2* | 7/2012 | Sommerfeld | ......... | B23B 47/287 |
| | | | | 408/115 R |
| 9,616,553 B2* | 4/2017 | Marovets | ................... | G09F 3/00 |
| 9,969,042 B2* | 5/2018 | Clark | ................. | B23Q 11/0042 |
| 10,722,951 B1* | 7/2020 | Clark | ....................... | B23Q 3/06 |

* cited by examiner

*Primary Examiner* — Eric A. Gates
*Assistant Examiner* — Paul M Janeski
(74) *Attorney, Agent, or Firm* — Parsons & Goltry; Robert Parsons; Michael Goltry

(57) ABSTRACT

A pocket hole jig with screw sizing system includes a pocket hole jig with a guide block reciprocally carried by a guide holder. The guide block can be raised or lowered relative the guide holder between a range of distances corresponding and calibrated to a horizontal range defined by a workpiece. A scale on a gauge member carried by the guide block is divided into a plurality of zones. An indicator is carried by the guide holder for indicating one of the plurality of zones by the position of the guide block relative the guide holder. Also provided is a series of different size screws, wherein each different size screw of the series corresponds to one of the plurality of zones.

18 Claims, 3 Drawing Sheets

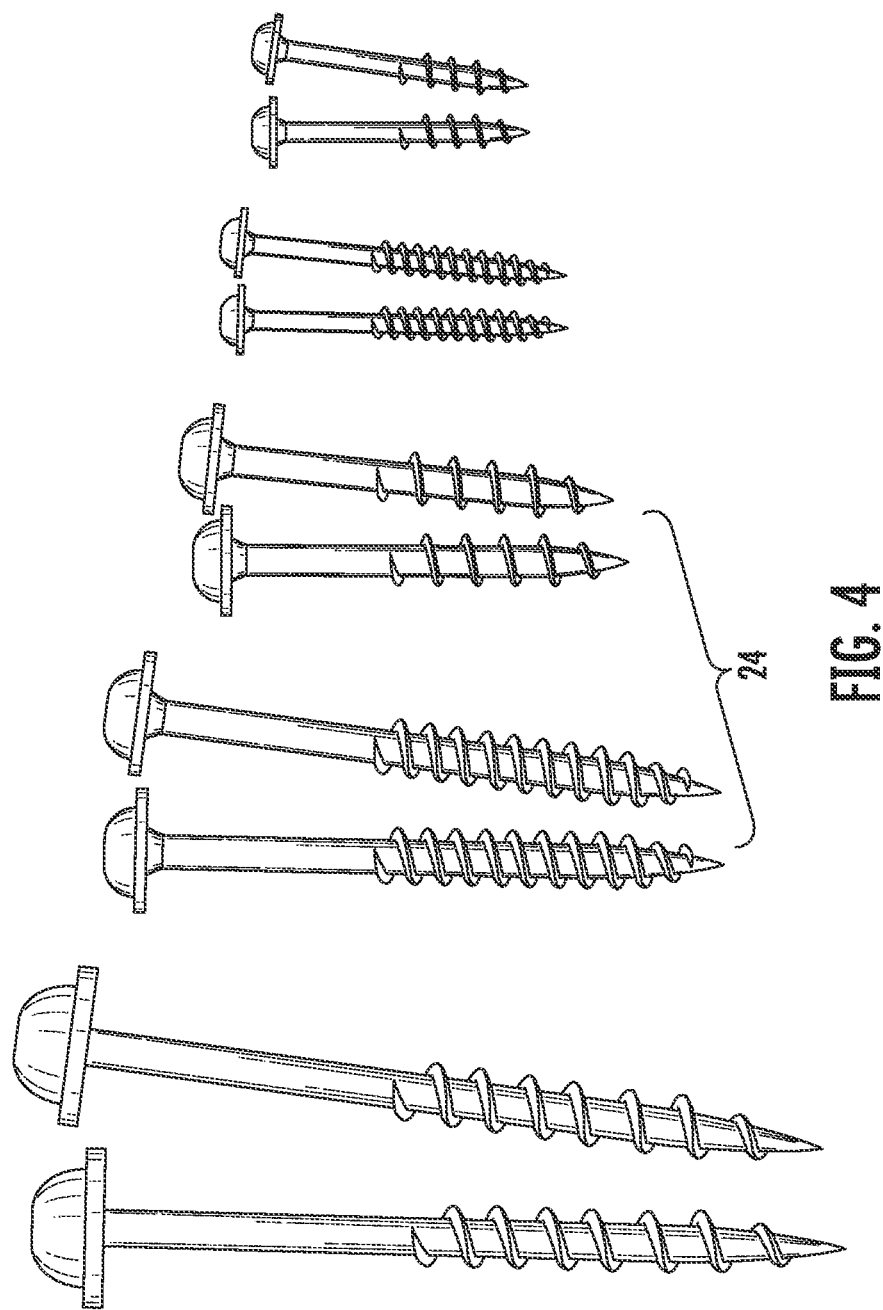

SCREW SIZING SYSTEM FOR POCKET HOLE JIGS

CROSS-REFERENCE TO RELATED APPLICATIONS

This application claims the benefit of U.S. Provisional Patent Application No. 62/771,138, filed 25 Nov. 2018.

FIELD OF THE INVENTION

This invention relates to pocket hole jigs.

More particularly, the present invention relates to selecting appropriate screw sizes when using a pocket hole jig.

BACKGROUND OF THE INVENTION

In the field of woodworking, pocket hole joinery is often used when joining boards at a right angle. Pocket hole joinery involves drilling a hole at an angle, usually 15 degrees, into one work piece, and then joining it to a second work piece with a self-tapping screw. While this process can be achieved without a jig, it is much more practical to use a pocket hole jig to help create pocket holes in a workpiece. Using a jig will insure the proper angle and depth of the pocket hole so as to form the best joint. With the use of a jig, you will get clean, accurate pocket holes.

Pocket hole jigs that are in common use include jigs that employ an adjustable guide block. The guide block is adjustable relative a clamped workpiece to allow for the formation of pocket holes in workpieces of different thicknesses. This is a very valuable and time saving feature. However, a drawback of the versatility of these jigs is the need to determine what size screw should be used. Since workpieces of differing thickness can be employed in the jig, screws of different sized must generally be employed to accommodate the different thicknesses. Thus, additional steps of measuring for the correct size screw must be performed or simply guessed at. Guessing can lead to insufficient size screws resulting in a weak joint, or too large screws resulting in damage to the pieces of the joint. Measuring requires additional time and frustration.

It would be highly advantageous, therefore, to remedy the foregoing and other deficiencies inherent in the prior art.

An object of the present invention is to provide a system for determining the size of screw to use.

Another object of the present invention is to provide a system associated with a guide block of a pocket hole jig to determine the size of the screw to use.

And another object of the present invention is to use indicia to associate screw size with workpiece thickness.

SUMMARY OF THE INVENTION

Briefly, to achieve the desired objects and advantages of the instant invention, provided is a pocket hole jig with screw sizing system including a pocket hole jig and a screw sizing system. The pocket hole jig includes a guide block reciprocally carried by a guide holder and a clamp assembly positioned adjacent the guide holder to clamp a workpiece against the guide block. A thickness of the workpiece can be found in a range of thicknesses which correspond to a horizontal range of distances between the clamp assembly and the guide block. The guide block can be raised or lowered relative the guide holder between a range of distances corresponding and calibrated to the horizontal range defined by the workpiece. The screw sizing system includes a gauge member carried by the guide block to move therewith. The gauge member includes a scale divided into a plurality of zones and extending the range of distances through which the guide block moves. An indicator is carried by the guide holder for indicating one of the plurality of zones by the position of the guide block relative the guide holder. Also provided is a series of different size screws, wherein each different size screw of the series corresponds to one of the plurality of zones.

The desired objects and advantages of the instant invention can also be achieved by a method including the steps of providing a pocket hole jig, providing a gauge member, the gauge member including a scale divided into a plurality of zones, and affixing the gauge member to the guide block with the scale extending the range of distances through which the guide block moves relative the guide holder. The workpiece is clamped between the clamp assembly and the guide block to establish a horizontal distance. The guide block is adjusted relative the guide holder to a distance corresponding and calibrated to the horizontal distance defined by the workpiece. One of the plurality of zones being indicated by the position of the guide block relative the guide holder is determined. A series of different size screws is provided, wherein each different size screw of the series of different size screws corresponds to one of the plurality of zones. The size screw indicated by the determined zone is selected.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which:

FIG. 4 is an illustration of the marked screws used in the sizing system according to the present invention.

DETAILED DESCRIPTION OF A PREFERRED EMBODIMENT

Figure 1:
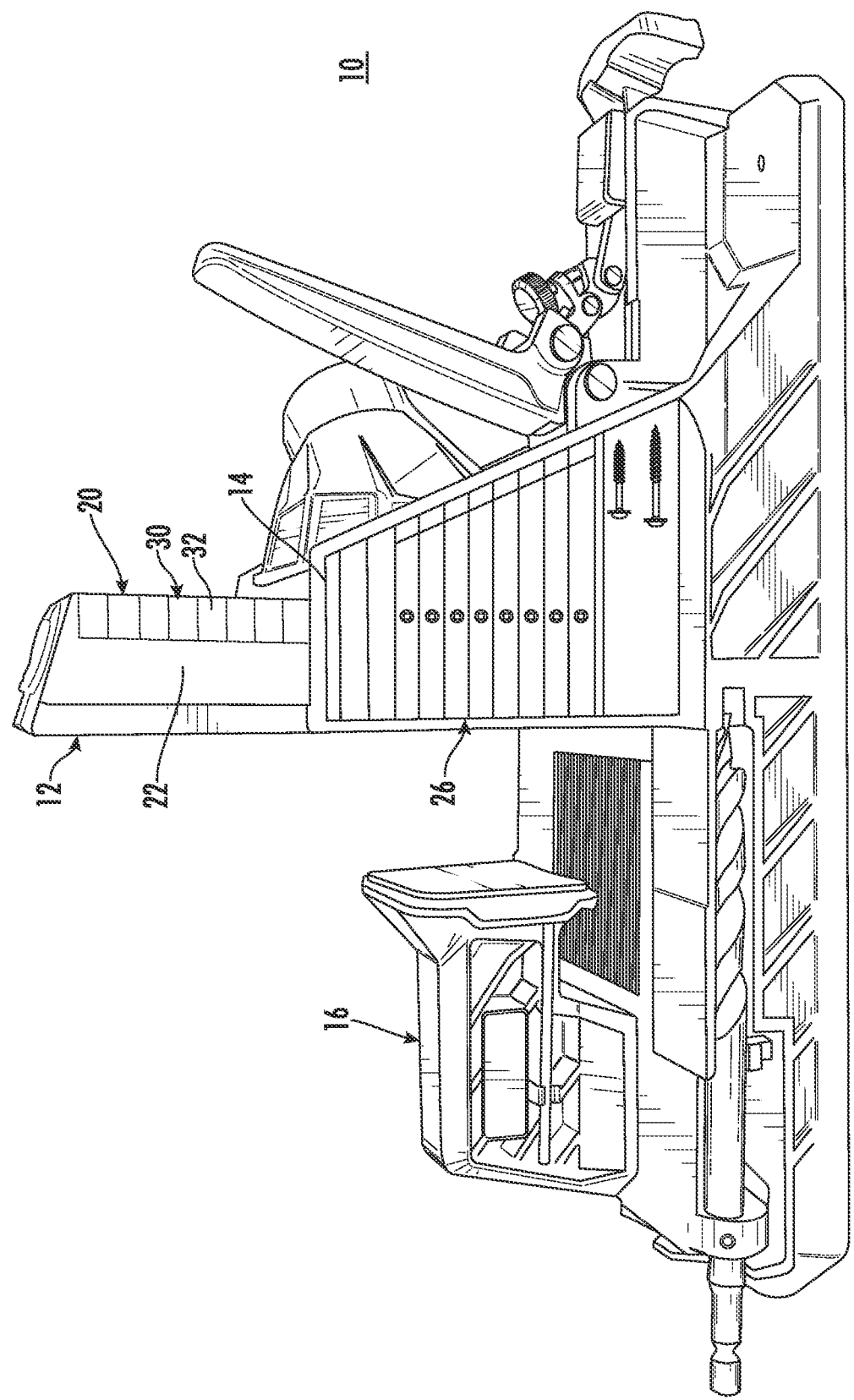
FIG. 1 is a side view of a pocket hole jig utilizing the sizing system according to the present invention.

Turning now to the drawings in which like reference characters indicate corresponding elements throughout the several views, attention is directed to FIG. 1 which illustrates a pocket hole jig, generally designated 10. Pocket hole jig 10 can be substantially any pocket hole jig that employs a guide block 12 reciprocally carried by a guide holder 14. A clamp assembly 16 is employed to clamp a workpiece against guide block 12 and/or guide holder 14. As is well known in the art, guide block 12 can be raised or lowered relative the workpiece to adjust the positioning of the pocket holes to be formed, depending on the thickness of the workpiece. Thus, workpieces can be found in a range of thicknesses which correspond to a horizontal range of distances between clamp assembly 16 and guide block 12 and/or guide holder 14. Guide block 12 is raised and lowered between a vertical range of distances corresponding and calibrated to the horizontal range. As the thickness of the workpiece increases, guide block 12 is moved upwards in guide holder 14. The adjustment of guide block 12 can be made manually, or as in the embodiment shown herein, movement is automatic with the adjustment of clamp assembly 16. Pocket hole jig 10 will not be described in greater detail as they are known in the art. Self-adjusting pocket hole jigs have been disclosed in co-pending U.S. patent application Ser. No. 15/683,525, filed Aug. 22, 2017, entitled SELF-ADJUSTING POCKET HOLE JIG, and Ser. No. 15/824,973, filed Nov. 28, 2017, entitled SELF-ADJUSTING POCKET HOLE JIG, both herein incorporated by reference.

Figure 3:
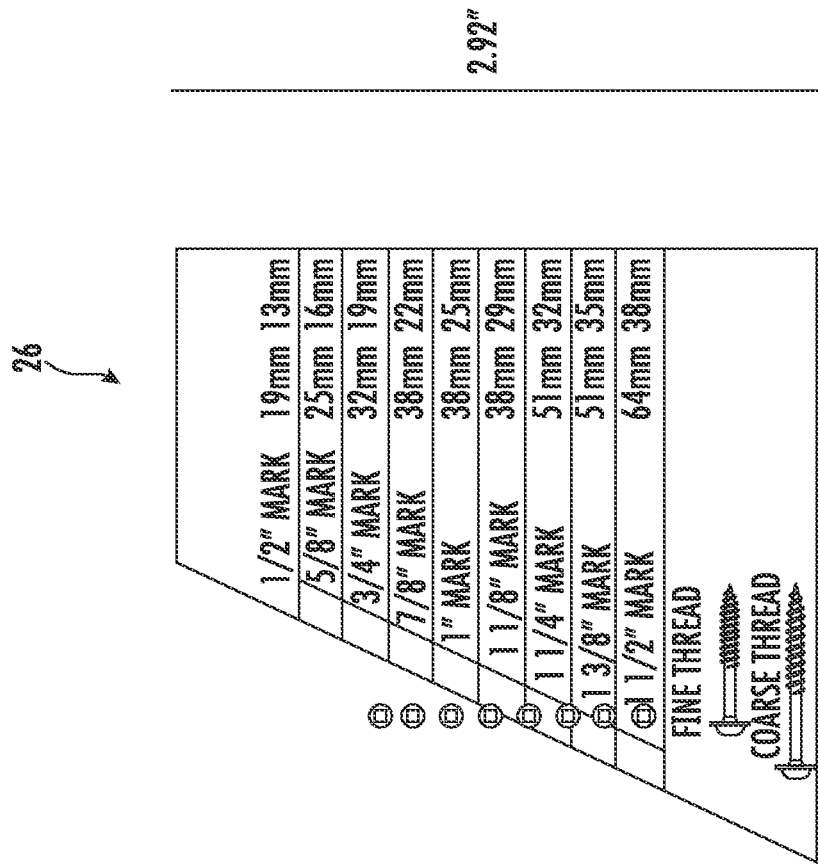
FIG. 3 is an illustration of a sizing chart for attachment to a pocket hole jig.
Figure 2:
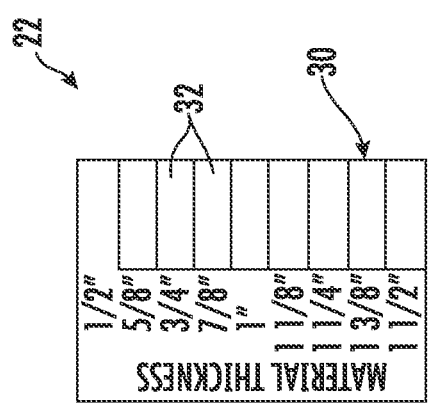
FIG. 2 is an illustration of a gauge member for attachment to a guide of a pocket hole jig.

Still referring to FIG. 1, with reference to FIGS. 2-4, a sizing system 20 is illustrated carried by pocket hole jig 10. Sizing system 20 includes a gauge member 22 (FIG. 2), a series of different size screws 24 (FIG. 4), and can include a chart 26 (FIG. 3) indicating which screw size to be used as determined by gauge member 22 and chart 26. Gauge member 22 is attached to guide block 12 and moves therewith. Gauge member 22 includes a scale 30 extending the entire vertical range of distances through which guide block 12 moves. Scale 30 is divided into a plurality of zones 32 extending along the axis of travel of guide block 12 and covers the vertical range of distances. Each zone 32 includes the distances (corresponding to a thickness of the workpiece) that can be accommodated by a specific size of screw 24. Specifically, each zone 32 cover a portion of the range of distances which corresponds to a specific size screw 24 as indicated by a color and in chart 26. A specific size screw is used for different thicknesses of workpieces. In other words, a short screw will not work properly in a thick workpiece, and a long screw will not work for, and can damage, a thin workpiece. The length of the screw required is determined by the thickness of the workpiece and is determined by the movement of guide block 12.

Gauge member 22 is affixed to a side of guide block 12 adjacent guide holder 14. An indicator, such as a top edge of guide holder 14, indicates which zone of scale 30 is relevant to the position of guide block 12 and thus the thickness of the workpiece. Gauge member 22 can be a plate of material or sheet of material affixed to guide block 12, or it can be imprinted on or formed in guide block 12. However gauge member 22 is attached, it includes zones preferably indicated by different colors, or other indicia. While color matching is preferred, it will be understood that the indicia can include names, numbers, sizes in inches or metric, shades, patterns and the like to indicate individual zones. When a workpiece is placed and clamped in position, guide block 12 is positioned along the vertical range of distance determined by the thickness of the workpiece. This position is indicated by one of the zones aligning with the indicator (top edge of guide holder 14). The color, shading or other indicia of the indicated zone is then matched to the chart affixed to the side of pocket hole jig 10 to determine the size of screw which should be used. It should also be understood that chart 26 need not be employed. By color coordinating (coordinating with matching indicia) screws 24 with zones 32, chart 26 can be eliminated or simply relegated as an accessory. Specifically, in this preferred embodiment, each zone 32 is assigned an individual color. The individual color is associated with the size of screw required. Screws 24 are associated with a color according to their size, such as length, by coloring the screw the associated color, marking a container containing the appropriate size screws with the associated color and the like. For example, a gauge reading indicating a yellow zone would tell a user that yellow screws should be employed. In this specific example, the yellow zone indicates that the work piece is ¾ inches thick, and a 32 mm length screw should be used. This information can be determined from chart 26 simply by matching the color indicated. However, the screw selection does not require chart 26. A user can simply select a yellow associated screw indicated by the yellow marked screw or by selecting a screw from a yellow marked container containing the appropriate size screws. Screws can be partially or entirely marked with the appropriate color, or provided in containers partially or entirely marked with the appropriate colors. As described previously, while colors are the preferred indicia, other indicia such as shades, patterns, numbers, names and the like can be employed to match specific size screws with specific zones.

It will be understood that while the preferred embodiment employs zones 32 having a height of ⅛ of an inch, other size zones can be employed, either bigger or smaller. Additionally, while each zone can have an associated screw size, the zones in some ranges of distance can employ the same size screw. For example, in this embodiment, three adjacent zones are shown as red. This is because the same screw size associated with red can be employed in each zone. It will also be understood that while each zone is equal size in the present embodiment, zones of different sizes may be employed, such as the three red zones being indicated as a single zone. Specifically, the range of distance in which the guide block moves is calibrated to the width of the workpiece to be processed. The range of distance the guide block moves is marked on a gauge carried by the guide block and sectioned into zones. Each zone is associated with a color (indicia), and each color is associated with a screw size for facilitating the selection of the appropriate screw size.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

The invention claimed is:

1. A pocket hole jig with screw sizing system, comprising:
a pocket hole jig including:
a guide block reciprocally carried by a guide holder;
a clamp assembly positioned adjacent the guide holder to clamp a workpiece against the guide block, wherein a thickness of the workpiece can be found in a range of thicknesses which correspond to a horizontal range of distances between the clamp assembly and the guide block;
wherein the guide block can be raised or lowered relative the guide holder between a range of distances corresponding and calibrated to the horizontal range defined by the workpiece;
a screw sizing system including:
a gauge member carried by the guide block to move therewith, the gauge member including a scale divided into a plurality of zones representing the range of distances through which the guide block moves, an indicator carried by the guide holder for indicating one of the plurality of zones by the position of the guide block relative the guide holder; and
a series of different size screws, wherein each different size screw of the series corresponds to one of the plurality of zones.

2. The pocket hole jig with screw sizing system as claimed in claim 1 wherein the indicator is a top edge of the guide holder.

3. The pocket hole jig with screw sizing system as claimed in claim 1 wherein each zone of the plurality of zones is designated by an indicium, and each size screw of the series of screws, corresponding to one of the plurality of zones, is designated by the indicium of the associated zone.

4. The pocket hole jig with screw sizing system as claimed in claim 1 wherein each zone of the plurality of zones is designated by a different color, and each size screw of the series of screws, is designated by the color corresponding to one of the plurality of zones.

5. The pocket hole jig with screw sizing system as claimed in claim 4 wherein each size screw of the series of screws is the color corresponding to one of the plurality of zones.

6. The pocket hole jig with screw sizing system as claimed in claim 1 further comprising a chart indicating which screw size to be used as determined by the one of the plurality of zones indicated by the interaction between the gauge member and the indicator.

7. A screw sizing system for use with a pocket hole jig including a guide block reciprocally carried by a guide holder, and a clamp assembly positioned adjacent the guide holder to clamp a workpiece against the guide block, wherein a thickness of the workpiece can be found in a range of thicknesses which correspond to a horizontal range of distances between the clamp assembly and the guide block, the screw sizing system comprising:
    a gauge member carried by the guide block to move therewith, the gauge member including a scale divided into a plurality of zones representing the range of distances through which the guide block moves, one of the plurality of zones being indicated by the position of the guide block relative the guide holder; and
    a series of different size screws, wherein each different size screw of the series corresponds to one of the plurality of zones.

8. The screw sizing system as claimed in claim 7 wherein each zone of the plurality of zones is designated by an indicium, and each size screw of the series of screws, corresponding to one of the plurality of zones, is designated by the indicium of the associated zone.

9. The screw sizing system as claimed in claim 7 wherein each zone of the plurality of zones is designated by a different color, and each size screw of the series of screws, is designated by the color corresponding to one of the plurality of zones.

10. The screw sizing system as claimed in claim 9 wherein each size screw of the series of screws is the color corresponding to one of the plurality of zones.

11. The screw sizing system as claimed in claim 7 further comprising a chart indicating which screw size to be used as determined by the one of the plurality of zones indicated by the interaction between the gauge member and the guide holder.

12. A method of determining screw size to use with a pocket hole, comprising the steps of:
    providing a pocket hole jig including:
    a guide block reciprocally carried by a guide holder;
    a clamp assembly positioned adjacent the guide holder for clamping a workpiece against the guide block, wherein a thickness of the workpiece can be found in a range of thicknesses which correspond to a horizontal range of distances between the clamp assembly and the guide block;
    wherein the guide block can be raised or lowered relative the guide holder between a range of distances corresponding and calibrated to the horizontal range defined by the workpiece;
    providing a gauge member, the gauge member including a scale divided into a plurality of zones;
    affixing the gauge member to the guide block with the scale representing the range of distances through which the guide block moves relative the guide holder, clamping the workpiece between the clamp assembly and the guide block to establish a horizontal distance;
    adjusting the guide block relative the guide holder to a distance corresponding and calibrated to the horizontal distance defined by the workpiece;
    determining one of the plurality of zones being indicated by the position of the guide block relative the guide holder; and
    providing a series of different size screws, wherein each different size screw of the series of different size screws corresponds to one of the plurality of zones; and
    selecting the size screw indicated by the determined zone.

13. The method of determining screw size to use with a pocket hole as claimed in claim 12 wherein the step of determining one of the plurality of zones being indicated includes the step of providing an indicator carried by guide holder.

14. The method of determining screw size to use with a pocket hole as claimed in claim 13 wherein the step of providing an indicator includes using a top edge of the guide holder as the indicator.

15. The method of determining screw size to use with a pocket hole as claimed in claim 12 further including the step of associating an indicium with each zone of the plurality of zones, and designating by the indicium of the associated zone, each size screw of the series of screws, corresponding to one of the plurality of zones.

16. The method of determining screw size to use with a pocket hole as claimed in claim 15 wherein each zone of the plurality of zones is designated by a different color, and each size screw of the series of screws, is designated by the color corresponding to one of the plurality of zones.

17. The method of determining screw size to use with a pocket hole as claimed in claim 16 wherein each size screw of the series of screws is the color corresponding to one of the plurality of zones.

18. The method of determining screw size to use with a pocket hole as claimed in claim 12 further including the step of providing a chart indicating which screw size to be used as determined by the one of the plurality of zones indicated by the interaction between the gauge member and the indicator.

* * * * *